Patented Mar. 20, 1934

1,951,355

UNITED STATES PATENT OFFICE 1,951,355

COLLOIDAL BROMINE AND PROCESS OF MAKING THE SAME

Ernest Govett, deceased, late of New York, N. Y., by Ernest H. Govett and Agnes H. Govett, executors, New York, N. Y.; said Ernest Govett assignor to Govett, Ltd., New York, N. Y., a corporation of New York No Drawing. Original application March 20, 1928, Serial No. 263,211. Patent No. 1,810,104, dated June 16, 1931. Divided and this application March 14, 1931, Serial No. 522,778. In France March 15, 1929

4 Claims. (Cl. 23—216)

The invention which forms the subject of the present application (a division of the copending application of ERNEST GOVETT, deceased, Serial No. 263,211, filed March 20, 1928 now patent Number 1,810,104 issued June 16, 1931) relates to bromine, and its chief object is to provide a colloidal form thereof, capable of making a homogeneous solution in water. This form of bromine, which is non-toxic and may be used freely for medicinal purposes without harmful effects, is obtained in solid form in what is apparently a hydrate. Another object is to provide a simple and reliable process of producing the colloidal form of bromine.

For making a colloidal form of bromine a process such as that described for making colloidal iodine in the aforesaid application of ERNEST GOVETT, Serial No. 263,211, may be followed; that is, first passing the bromine through a reaction with an organic acid such as tannic or gallic acid referred to, then forming an insoluble bromine compound of silver, lead, copper or other suitable metal, preferably mercury, which insoluble compound is then decomposed into an insoluble compound devoid of bromine with liberation of the halogen in solution, followed (if desired) by evaporation, giving a colloidal bromine hydrate in solid form. However, a modified process is preferred, as will be described hereinafter.

As stated above, colloidal bromine may be prepared in much the same way as colloidal iodine. For example the insoluble colloidal bromide of silver, lead, copper, bismuth, mercury or other metal is preferably decomposed by treating the heated bromide with nitric acid, causing, apparently, the reaction $$HgBr_2 + 2HNO_3 = HgO + N_2O_5 + 2HBr.$$

The nitrogen pentoxide goes off as a gas. The insoluble oxide is removed and the filtrate is evaporated to dryness, giving a powder which appears to have the composition $Br(H_2O)_5$. Or to the hydrogen bromide solution (made preferably with tannic acid) an alkali metal hydroxide may be added, by preference potassium hydroxide, forming an insoluble compound which appears to be a tannate. The greater part of the latter separates out, and is removed by filtration. The solution is allowed to stand several weeks for further precipitation and the filtered solution is heated to about 60° C. When quite cold it is filtered again, leaving substantially pure hydrogen bromide (HBr) in solution, which is evaporated to dryness. In this step the bromide is broken up.

The preferred method, however, is as follows. Potassium bromate is dissolved in a solution of tannic acid, using 2.25 parts by weight of the acid to 1 part of the bromate, and preferably using not more than about 150 grams of the acid per liter of the solution. This produces a compound which is believed to be colloidal hydrogen bromide (HBr), and a potassium salt which appears to be a tannate ($KC_{14}H_{10}O_9$). Heating the solution to about 70° C. to insure decomposition of all the bromate, a little nitric acid is added, say 1 gram to each 15 grams of bromate used. A violent reaction ensues, due to decomposition of a little nitrogen pentoxide formed, and nearly all the tannate settles out. The solution is filtered off and allowed to stand several weeks, for further precipitation of tannate. It is then filtered again, and the filtrate is heated to about 60° C., and when it has become quite cold it is again filtered, leaving substantially pure hydrogen bromide in solution. Upon evaporating the solution a reddish powder is obtained which is believed to have the composition $Br(H_2O)_5$. Any small amount of acid remaining can be removed by re-solution and re-evaporation. The hydrate is stable up to about 100° C. At somewhat high temperature it loses water, behaving then as if its composition were 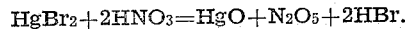$Br(H_2O)_{2\frac{1}{4}}$. Both hydrates form homogeneous solutions in water and are stable therein.

As used in the claims, the term "water miscible" includes a true solution and a colloidal solution.

In accordance with the statutes we have described the invention of ERNEST GOVETT, deceased, in such detail as will enable others, skilled in the art to which it appertains or to which it is most nearly related, to practice the invention, and we have also stated what we believe to be a correct scientific theory, but we desire it to be understood that we do not consider the invention limited to such theory or to the details referred to.

What is claimed as the invention of said ERNEST GOVETT is:

1. In a process of preparing bromine hydrate, causing potassium bromate and a suitable carboxylic acid to react with production of a hydrogen bromine compound in solution and an insoluble potassium compound, removing the latter, and evaporating the hydrogen bromine solution to dryness whereby the said compound is decomposed and bromine hydrate is obtained in solid form.

2. In a process of preparing a bromine hydrate, causing potassium bromate and tannic acid to react with production of a hydrogen bromine compound in solution and potassium tannate, removing the tannate, and evaporating the hydrogen bromine compound solution to dryness whereby the said compound is decomposed and bromine hydrate is obtained in solid form.

3. In a process of preparing a bromine hydrate, dissolving potassium bromate in a solution of tannic acid whereby a hydrogen bromine compound in solution and potassium tannate are produced, heating the solution to insure decomposition of all of the bromate, adding a small amount of nitric acid to the solution, whereby substantially all the tannate is precipitated, removing the precipitated tannate and subsequently evaporating the hydrogen bromine compound solution to dryness whereby the said compound is decomposed and bromine hydrate is obtained in solid form.

4. As a new product, a water miscible non-toxic bromine hydrate which is stable up to 100° C.

ERNEST H. GOVETT,
AGNES H. GOVETT,
*Executors of the Estate of Ernest Govett, Deceased.*